UNITED STATES PATENT OFFICE.

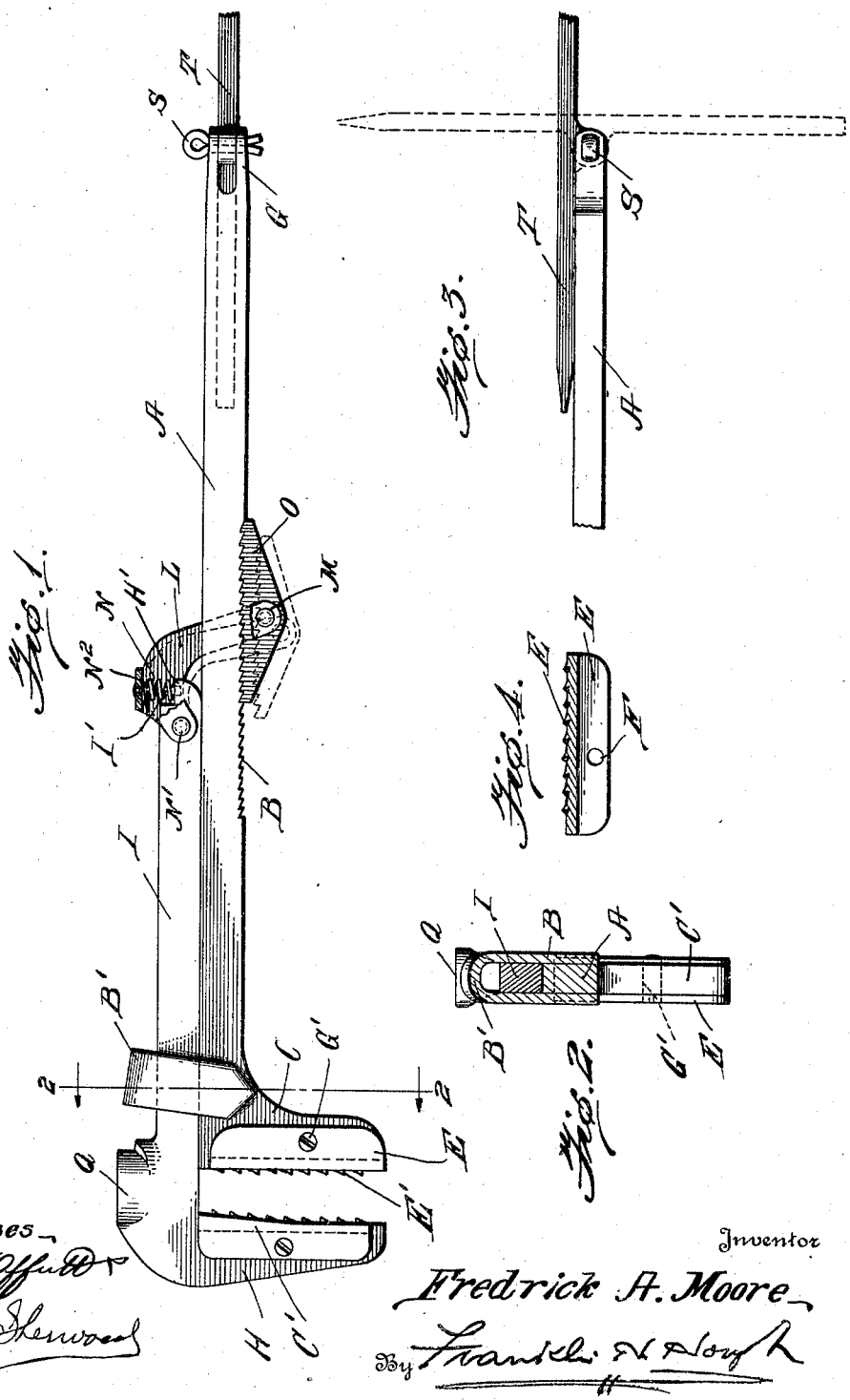

FREDRICK A. MOORE, OF TOWANDA, KANSAS.

WRENCH.

1,303,709.  Specification of Letters Patent.  Patented May 13, 1919.

Application filed March 15, 1917, Serial No. 155,021. Renewed November 13, 1918. Serial No. 262,402.

*To all whom it may concern:*

Be it known that I, FREDRICK A. MOORE, a citizen of the United States, residing at Towanda, in the county of Butler and State of Kansas, have invented certain new and useful Improvements in Wrenches; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in wrenches and comprises a simple and efficient device of this nature having various details of construction, combinations and arrangements of parts which will be hereinafter fully described, shown in the accompanying drawings and then specifically defined in the appended claim.

I illustrate my invention in the accompanying drawings, in which:—

Figure 1 is a side elevation of my improved wrench.

Fig. 2 is a sectional view on line 2—2 of Fig. 1.

Fig. 3 is a detail view of a handle pivoted to the end of the shank portion of the wrench.

Fig. 4 is a detail view, partly in section of the removable jaw face.

Reference now being had to the details of the drawings by letter, A designates the shank portion of a wrench having ratchet teeth B upon one face thereof and is provided with an integral jaw C which, in the present instance, has a removable face E provided with teeth E′, adapting the same for use as a pipe wrench. The removable face E is provided with a lateral opening F′ to receive the screw G′ which has its threaded end positioned in a threaded opening formed in the jaw C, and it will be seen that through the medium of the screw G′, the face E may be rigidly connected to the jaw C. H designates a movable jaw having a shank portion I of shorter length than the shank portion A and movable relative to the latter against which it contacts. A stirrup-shaped member L is pivotally mounted upon the pin N′ carried by the shank I and has a cross piece N² through which a pin I′ passes and which also engages a hole in the shoulder H′ formed in the end of the shank I. A coiled spring N is mounted about said pin and bears intermediate the cross piece N² and the shoulder on the shank I. A serrated dog O is pivotally mounted upon the pin M between the arms of the clevis-shaped member, which dog projects upon either side of said arms. The serrations of the dog are adapted to be held in engagement with the teeth B upon the shank A through the medium of the coiled spring N. Said dog is preferably pivoted at one side of its center as at M, so that the thumb of the operator may tilt the dog against the tension of the spring N to release the teeth from the teeth upon the shank portion of the fixed jaw, after which, by pushing upon the dog, the sliding jaw may be moved to various positions. When the movable jaw has arrived at its adjusted position, the teeth of the dog will be moved into engagement with the teeth 13 of the shank A and thereby hold the movable jaw H and rigid jaw fixed with relation to each other.

Adjacent the jaw C is an integral loop portion B′ embracing the shank I, thereby insuring the jaws being held rigid. It might be further stated that the movable jaw H is also provided with a removable jaw face C′, also secured to its jaw H.

A handle T is pivotally mounted upon a pin S carried in apertures in the opposite walls of the bifurcated end G of the shank portion of the fixed jaw and serves as a means for turning the wrench when gripping a pipe to be turned.

What I claim to be new is:—

A wrench having two jaws with shank portions of different lengths and having sliding contact with each other, one of said shank portions having a shoulder at its end and the other provided with serrations, a stirrup-shaped member pivoted to the shouldered shank portion and provided with a cross piece extending over the shoulder, a pin projecting from the cross piece and engaging a hole in the shoulder, a coiled spring mounted upon the pin and bearing intermediate the cross piece and the shoulder, a serrated dog pivotally mounted between the arms of said stirrup-shaped member and projecting upon either side thereof, and adapted to engage said serrations upon the shank portion of the jaw.

In testimony whereof I hereunto affix my signature in presence of two witnesses.

FREDRICK A. MOORE.

Witnesses:
JESSIE CRAWFORD,
WILLIE LANCASTER.

Copies of this patent may be obtained for five cents each, by addressing the "Commissioner of Patents, Washington, D. C."